(12) United States Patent
Moore et al.

(10) Patent No.: US 10,750,256 B1
(45) Date of Patent: Aug. 18, 2020

(54) WAVELENGTH CONVERSION FOR OPTICAL PATH PROTECTION

(71) Applicant: Fujitsu Limited, Kawasaki-shi, Kanagawa (JP)

(72) Inventors: Francois Georges Joseph Moore, Plano, TX (US); Richard Dunsmore, McKinney, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/434,509

(22) Filed: Jun. 7, 2019

(51) Int. Cl.
| H04J 14/02 | (2006.01) |
| H04Q 11/00 | (2006.01) |
| H04B 10/032 | (2013.01) |

(52) U.S. Cl.
CPC ....... *H04Q 11/0005* (2013.01); *H04B 10/032* (2013.01); *H04J 14/0289* (2013.01); *H04Q 2011/0011* (2013.01)

(58) Field of Classification Search
CPC ......................................... H04J 14/0289–0291
See application file for complete search history.

(56) References Cited

U.S. PATENT DOCUMENTS

| 5,982,517 A * | 11/1999 | Fishman | ............... | H04B 10/032 370/222 |
| 6,400,477 B1 * | 6/2002 | Wellbrook | .......... | H04J 14/0295 398/45 |
| 6,744,553 B1 * | 6/2004 | Islam | ................... | G02F 1/3536 359/326 |
| 9,857,662 B2 | 1/2018 | Kato et al. | | |
| 2002/0109879 A1 * | 8/2002 | Wing So | .................. | H04J 7/00 398/58 |
| 2003/0185566 A1 * | 10/2003 | Nishi | ....................... | H04J 7/00 398/58 |
| 2019/0222345 A1 * | 7/2019 | Karube | .............. | H04J 14/0209 |

* cited by examiner

*Primary Examiner* — Nathan M Cors
(74) *Attorney, Agent, or Firm* — Baker Botts L.L.P.

(57) ABSTRACT

A system for protecting optical paths may exchange first optical signal traffic between source and destination locations over a first fiber cable comprising optical signals having wavelengths within a first predefined optical wavelength band, exchange second optical signal traffic between the source and destination locations over a second fiber cable comprising optical signals having wavelengths within the first optical wavelength band, convert the first optical signal traffic to third optical signal traffic comprising optical signals having wavelengths within a second predefined optical wavelength band, detect an interruption in the exchange of the first optical signal traffic and, in response to detecting the interruption, cause the third optical signal traffic to be carried from the first location to the second location over the second fiber cable in the second optical wavelength band while the second optical signal traffic is exchanged over the second fiber cable in the first optical wavelength band.

20 Claims, 10 Drawing Sheets

WAVELENGTH CONVERSION FOR OPTICAL PATH PROTECTION

BACKGROUND

Field of the Disclosure

The present disclosure relates generally to optical communication networks and, more particularly, to systems and methods for providing optical path protection in optical networks using wavelength conversion.

Description of the Related Art

Telecommunications systems, cable television systems and data communication networks use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WS S), optical switches, couplers, etc. to perform various operations within the network. Optical networks may also include various network elements, such as amplifiers, dispersion compensators, multiplexer/demultiplexer filters, wavelength selective switches, couplers, etc. configured to perform various operations within the network.

In some optical networks, network resource utilization in optical networks may be limited due to spectral slot fragmentation. In some cases, fiber capacity utilization may be increased through the use of recoloring elements, which are operable to shift individual optical channels to different wavelengths. For example, an optoelectronic wavelength converter, such as an optical-electrical-optical regenerator, converts a received optical signal to an electrical signal and then converts the electrical signal to an optical signal at a different targeted wavelength. Some all-optical wavelength shifters may be used to shift individual optical channels by a given amount.

SUMMARY

In one aspect, a system for protecting optical paths using wavelength conversion is disclosed. The system includes a first fiber cable between a first location and a second location, a second fiber cable between the first location and the second location, a first collection of transponders at the first location configured to exchange first optical signal traffic with a second collection of transponders at the second location over the first fiber cable, a third collection of transponders at the first location configured to exchange second optical signal traffic with a fourth collection of transponders at the second location over the second fiber cable, a first optical wavelength converter at the first location, and a first optical switch at the first location. The first collection of transponders is configured to generate the first optical signal traffic as optical signals having wavelengths within a first one of multiple predefined optical wavelength bands. The third collection of transponders is configured to generate the second optical signal traffic as optical signals having wavelengths within the first one of the multiple predefined optical wavelength bands. The first optical wavelength converter is configured to convert the first optical signal traffic to third optical signal traffic comprising optical signals having wavelengths within a second one of the multiple predefined optical wavelength bands. The first optical switch is configured to detect an interruption in the exchange of the first optical signal traffic over the first fiber cable and, responsive to the detection of the interruption in the exchange of the first optical signal traffic, to cause the third optical signal traffic to be carried to the second location over the second fiber cable while the second optical signal traffic is exchanged with the fourth collection of transponders at the second location over the second fiber cable.

In any of the disclosed embodiments, the first wavelength converter may include a nonlinear medium that converts all wavelengths within the first one of the multiple predefined optical wavelength bands to respective wavelengths within the second one of the multiple predefined optical wavelength bands.

In any of the disclosed embodiments, the system may further include a band combiner at the first location configured to combine the third optical signal traffic and the second optical signal traffic for transmission to the second location over the second fiber cable, a band splitter at the second location configured to split transmissions received over the second fiber cable into the third optical signal traffic and the second optical signal traffic, a second optical wavelength converter at the second location configured to convert the third optical signal traffic to fourth optical signal traffic comprising optical signals having wavelengths within the first one of the multiple predefined optical wavelength bands, and a second optical switch at the second location configured to detect the interruption in the exchange of the first optical signal traffic over the first fiber cable and, responsive to the detection of the interruption in the exchange of the first optical signal traffic, to cause the fourth optical signal traffic to be provided to the second collection of transponders.

In any of the disclosed embodiments, the multiple predefined optical wavelength bands may include two or more of: the C-Band, comprising wavelengths between 1530 and 1565 nanometers, the L-Band, comprising wavelengths between 1565 and 1625 nanometers, and the S-Band, comprising wavelengths between 1460 and 1530 nanometers.

In any of the disclosed embodiments, the first optical signal traffic and the second optical signal traffic may include optical signals having wavelengths within the C-Band, and the third optical signal traffic may include optical signals having wavelengths within the L-Band or within the S-Band.

In any of the disclosed embodiments, the first optical signal traffic and the second optical signal traffic may include optical signals having wavelengths within the L-Band, and the third optical signal traffic may include optical signals having wavelengths within the C-Band.

In any of the disclosed embodiments, each transponder in the first collection of transponders may be configured to generate and receive optical signals having a respective one of the wavelengths within the first one of the multiple predefined optical wavelength bands, each transponder in the second collection of transponders is configured to generate and receive optical signals having a respective one of the wavelengths within the first one of the multiple predefined optical wavelength bands, each transponder in the third collection of transponders is configured to generate and receive optical signals having a respective one of the wavelengths within the first one of the multiple predefined optical wavelength bands, and each transponder in the fourth collection of transponders is configured to generate and receive optical signals having a respective one of the wavelengths within the first one of the multiple predefined optical wavelength bands.

In any of the disclosed embodiments, the system may further include a second optical wavelength converter at the first location configured to convert the second optical signal traffic to fourth optical signal traffic comprising optical signals having wavelengths within the second one of the multiple predefined optical wavelength bands, and a second optical switch at the first location configured to detect an interruption in the exchange of the second optical signal traffic over the second fiber cable and, responsive to the detection of the interruption in the exchange of the second optical signal traffic, to cause the fourth optical signal traffic to be carried to the second location over the first fiber cable while the first optical signal traffic is exchanged with the second collection of transponders at the second location over the first fiber cable.

In any of the disclosed embodiments, the system may further include a band combiner at the first location configured to combine the fourth optical signal traffic and the first optical signal traffic for transmission to the second location over the first fiber cable, a band splitter at the second location configured to split transmissions received over the first fiber cable into the fourth optical signal traffic and the first optical signal traffic, a third optical wavelength converter at the second location configured to convert the fourth optical signal traffic to fifth optical signal traffic comprising optical signals having wavelengths within the first one of the multiple predefined optical wavelength bands, and a third optical switch at the second location configured to detect the interruption in the exchange of the second optical signal traffic over the second fiber cable and, responsive to the detection of the interruption in the exchange of the second optical signal traffic, to cause the fifth optical signal traffic to be provided to the second collection of transponders.

In any of the disclosed embodiments, the second collection of transponders may be configured to exchange fourth optical signal traffic with the first collection of transponders at the first location over the first fiber cable, the second collection of transponders being configured to generate the fourth optical signal traffic as optical signals having wavelengths within the first one of multiple predefined optical wavelength bands, the fourth collection of transponders is configured to exchange fifth optical signal traffic with the third collection of transponders at the first location over the second fiber cable, the fourth collection of transponders being configured to generate the fifth optical signal traffic as optical signals having wavelengths within the first one of the multiple predefined optical wavelength bands, and the system may further include a second optical wavelength converter at the second location configured to convert the fourth optical signal traffic to sixth optical signal traffic comprising optical signals having wavelengths within the second one of the multiple predefined optical wavelength bands and a second optical switch at the second location configured to detect an interruption in the exchange of the fourth optical signal traffic over the first fiber cable and, responsive to the detection of the interruption in the exchange of the fourth optical signal traffic, to cause the sixth optical signal traffic to be carried to the first location over the second fiber cable while the fifth optical signal traffic is exchanged with the third collection of transponders at the first location over the second fiber cable.

In any of the disclosed embodiments, the first fiber cable may traverse a different path between the first location and the second location than the path between the first location and the second location traversed by the second fiber cable.

In another aspect, a method for protecting optical paths using wavelength conversion is disclosed. The method includes beginning to exchange first optical signal traffic between a first location and a second location over a first fiber cable, the first optical signal traffic comprising optical signals generated at the first location having wavelengths within a first one of multiple predefined optical wavelength bands, beginning to exchange second optical signal traffic between the first location and the second location over a second fiber cable, the second optical signal traffic comprising optical signals generated at the first location having wavelengths within the first one of the multiple predefined optical wavelength bands, converting, at the first location, the first optical signal traffic to third optical signal traffic comprising optical signals having wavelengths within a second one of the multiple predefined optical wavelength bands, detecting, at the first location, an interruption in the exchange of the first optical signal traffic over the first fiber cable and, in response to detecting the interruption in the exchange of the first optical signal traffic, causing the third optical signal traffic to be carried from the first location to the second location over the second fiber cable while the second optical signal traffic is exchanged over the second fiber cable.

In any of the disclosed embodiments, converting the first optical signal traffic to the third optical signal traffic may include converting all wavelengths within the first one of the multiple predefined optical wavelength bands to corresponding wavelengths within the second one of the multiple predefined optical wavelength bands.

In any of the disclosed embodiments, converting the first optical signal traffic to the third optical signal traffic may be performed in response to detecting the interruption in the exchange of the first optical signal traffic over the first fiber cable.

In any of the disclosed embodiments, the method may further include combining, at the first location, the third optical signal traffic and the second optical signal traffic for transmission to the second location over the second fiber cable, splitting, at the second location, transmissions received over the second fiber cable into the third optical signal traffic and the second optical signal traffic, and converting, at the second location, the third optical signal traffic to fourth optical signal traffic comprising optical signals having wavelengths within the first one of the multiple predefined optical wavelength bands.

In any of the disclosed embodiments, the multiple predefined optical wavelength bands may include two or more of: the C-Band, comprising wavelengths between 1530 and 1565 nanometers, the L-Band, comprising wavelengths between 1565 and 1625 nanometers, and the S-Band, comprising wavelengths between 1460 and 1530 nanometers.

In any of the disclosed embodiments, the first optical signal traffic and the second optical signal traffic may include optical signals having wavelengths within the C-Band and the third optical signal traffic may include optical signals having wavelengths within the L-Band.

In any of the disclosed embodiments, the method may further include, prior to detecting the interruption in the exchange of the first optical signal traffic over the first fiber cable, beginning to exchange fourth optical signal traffic between the second location and the first location over the first fiber cable, the fourth optical signal traffic comprising optical signals generated at the second location having wavelengths within the first one of the multiple predefined optical wavelength bands, and beginning to exchange fifth optical signal traffic between the second location and the first location over the second fiber cable, the fifth optical signal traffic comprising optical signals generated at the second location having wavelengths within the first one of the multiple predefined optical wavelength bands, converting, at the second location, the fourth optical signal traffic to sixth optical signal traffic comprising optical signals having wavelengths within the second one of the multiple predefined optical wavelength bands, detecting, at the second location, an interruption in the exchange of the fourth optical signal traffic over the first fiber cable and, in response to detecting the interruption in the exchange of the fourth optical signal traffic, causing the sixth optical signal traffic to be carried from the second location to the first location over the second fiber cable while the fifth optical signal traffic is exchanged over the second fiber cable.

In any of the disclosed embodiments, converting the fourth optical signal traffic to the sixth optical signal traffic may be performed in response to detecting the interruption in the exchange of the fourth optical signal traffic.

In any of the disclosed embodiments, the first fiber cable and the second fiber cable may be of different lengths.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
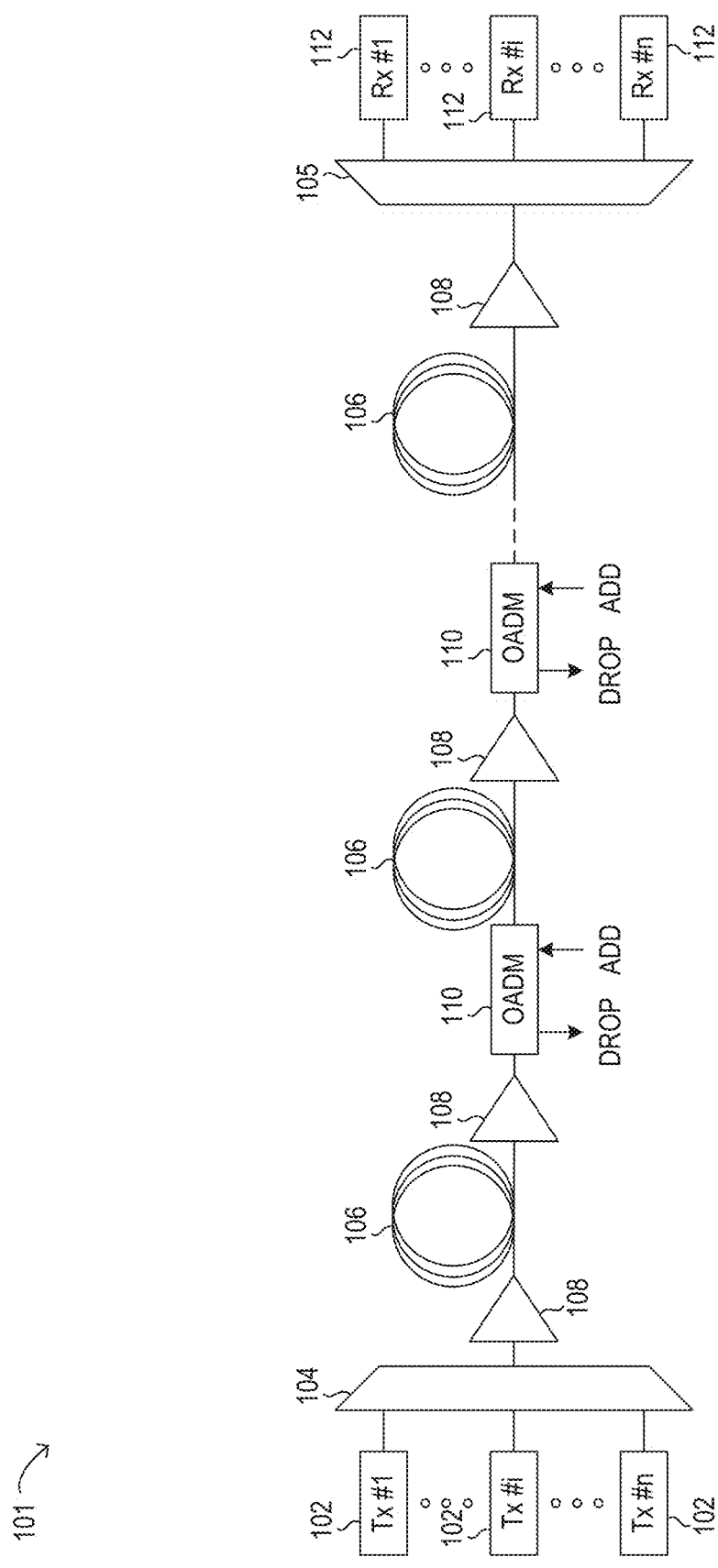
FIG. 1 is a block diagram illustrating selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Terabit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wide-band optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. For example, in some optical networks, each of optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) or a multicast switch (MCS) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a ninety-six (96) channel DWDM signal. Demultiplexer 105 may divide the single, ninety-six channel DWDM signal into ninety-six separate signals according to the ninety-six different channels. It will be understood that different numbers of channels or subcarriers may be transmitted and demultiplexed in optical transport network 101, in various embodiments.

In FIG. 1, optical network 101 may also include receivers 112 coupled to demultiplexer 105. Each receiver 112 may receive optical signals transmitted at a particular wavelength or channel and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, or a hierarchical network topology.

The ability to provide optical path redundancy has historically been an important feature in telecommunication services. Telecommunication carriers operating optical networks have traditionally dedicated a redundant fiber on an alternate path between source and destination locations. With this approach, the alternate path must be available to transport optical signal traffic in the event that the fiber on the primary path is cut or otherwise fails. Therefore, the fiber capacity on the alternate path is not used for normal optical signal traffic, but is reserved (i.e., left open) for path protection. This may result in wasted or stranded resources, in that fifty percent of the fiber capacity of the optical network cannot be used, and in significant costs to duplicate fiber capacity.

As will be described in further detail, systems and methods are disclosed herein for providing optical path protection in optical networks using wavelength conversion. More specifically, the systems described herein may implement an approach to optical path protection that utilizes previously unused fiber capacity in an optical wavelength band other than the optical wavelength band within which the wavelengths of the optical signal traffic being transmitted on the primary path fall. For example, in some embodiments, each of two fiber cables traversing respective paths between the same source and destination location pair may carry normal optical signal traffic between the source and destination locations as optical signals having wavelengths within the C-Band and each of the fiber cables may also provide protection for the optical signal traffic being transmitted over the fiber cable on the other path. In these embodiments, in the event of a fiber failure on a first one of the paths, the optical signal traffic transmitted on the first path as optical signals having wavelengths within the C-Band may be converted by a wavelength converter device to optical signal traffic comprising optical signals having wavelengths within the L-Band. The converted optical signal traffic may then be transmitted on the fiber cable traversing the second path along with the normal optical signal traffic between the source and destination locations being carried on the second path as optical signals having wavelengths within the C-Band. In at least some embodiments, this path protection approach may eliminate the need to dedicate an unused fiber cable for optical path protection in the optical network.

Figure 2:
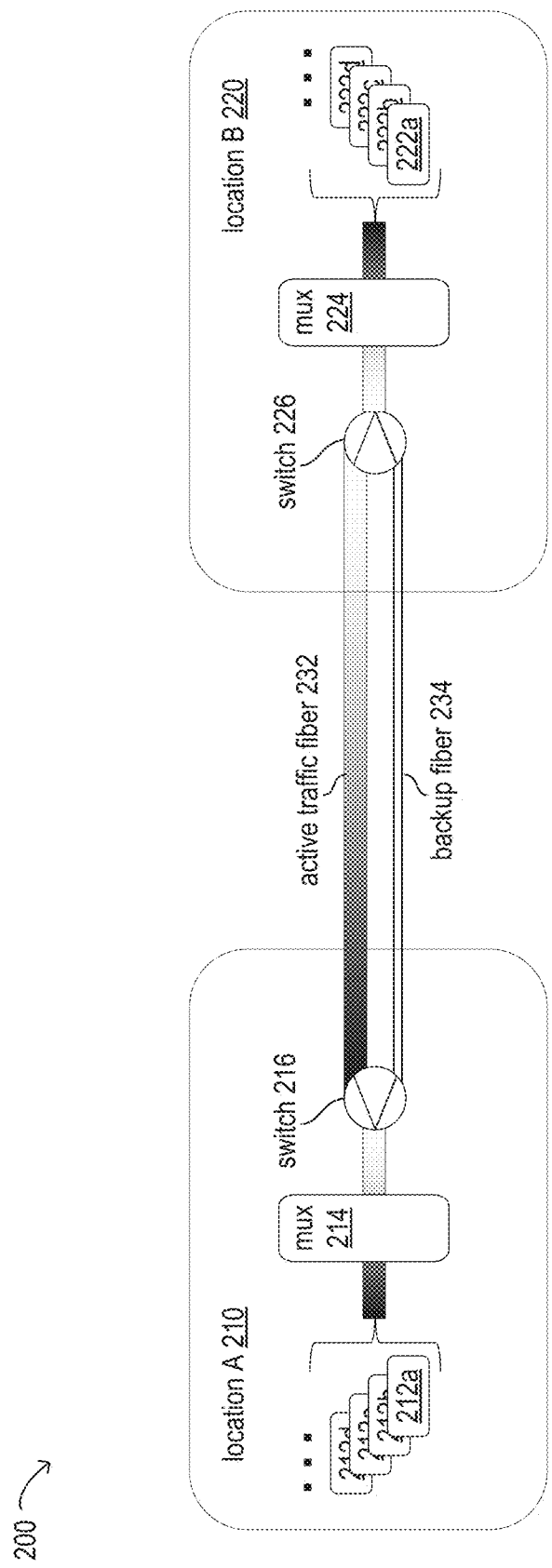
FIG. 2 is a block diagram illustrating selected elements of an optical network including an active traffic fiber and a backup fiber.

FIG. 2 is a block diagram illustrating selected elements of an optical network 200 including an active traffic fiber and a backup fiber. This arrangement may represent a typical approach to protecting point-to-point traffic, in some existing systems. In the illustrated embodiment, optical network 200 includes, at location A (210), multiple transponders 212, a multiplexer 214, and an optical switch 216. Optical network 200 also includes, at location B (220), multiple transponders 222, a multiplexer 224 and an optical switch 226. In this example embodiment, optical signal traffic may be exchanged between the transponders 212 at location A (210) and the transponders 222 at location B (420) over one of two fibers, shown in FIG. 2 as active traffic fiber 232 and backup fiber 234, each of which is coupled to optical switch 216 and optical switch 226. For example, each of the transponders may be configured to generate and/or receive optical signals having a respective one of the wavelengths defined within a first predefined optical wavelength band (e.g., within the C-Band), at various times. In other embodiments, there may be separate optical transmitters and receivers at each of location A (210) and location B (220) for each such wavelength. In this example, because there are 96 wavelengths defined within the C-Band, there may be 96 transponders 212, i.e., one transponder 212 for each wavelength within the C-Band, that collectively generate optical signal traffic for transmission over one of the fibers 232 and 234, and 96 transponders 222 that collectively receive optical signal traffic generated by transponders 412 over one of the fibers 232 and 234.

The outputs of the transponders 212 are input to multiplexer 214, the output of which is optical signal traffic containing all 96 wavelengths of the C-Band. In the illustrated example, the optical signal traffic output by multiplexer 214 is provided to optical switch 216, which determines the one of the fibers 232 and 234 over which the optical signal traffic is carried and from which the optical signal traffic is received at location B (220). The received optical signal traffic, whether received over active traffic fiber 232 or backup fiber 234 is input to optical switch 226, which selects the source of received optical signal traffic to be provided to multiplexer 224 for demultiplexing. Multiplexer 224 demultiplexes the received optical signal traffic into the 96 wavelengths of the C-Band, each of which is provided to a respective one of the 96 transponders 222.

By default, optical switch 216 may select the fiber cable designated as active traffic fiber 232 to carry the optical signal traffic generated by the transponders 212 to location B (220) and optical switch 226 may select the fiber cable designated as active traffic fiber 232 as the fiber from which to receive the optical signal traffic to be provided to multiplexer 224. In this case, the backup fiber 234 is not being used to carry any optical signal traffic between location A (210) and location B (220). For example, the active traffic fiber 232 may carry on the order of 10 Terabits or more of optical traffic while the backup fiber 234 is essentially dark. However, if and when the optical switches 216 and 226 detect an interruption in the exchange of optical signal traffic over active traffic fiber 232 (e.g., if the active traffic fiber 232 is cut or otherwise fails), optical switch 216 may select the fiber cable designated as backup fiber 234 to carry the optical signal traffic generated by the transponders 212 to location B (220) and optical switch 226 may select the fiber cable designated as backup fiber 232 as the fiber from which to receive the optical signal traffic to be provided to multiplexer 224.

In some embodiments, fiber cables that traverse different paths between the same source and destination location pair might or might not have identical characteristics and/or capacity. For example, in some embodiments, two fiber cables that traverse different paths between the same source and destination location pair may include fibers of the same grade. However, if the different paths between the source and destination locations are of significantly different lengths, the characteristics of the two fiber cables may be different due to their different lengths.

Figure 3A:
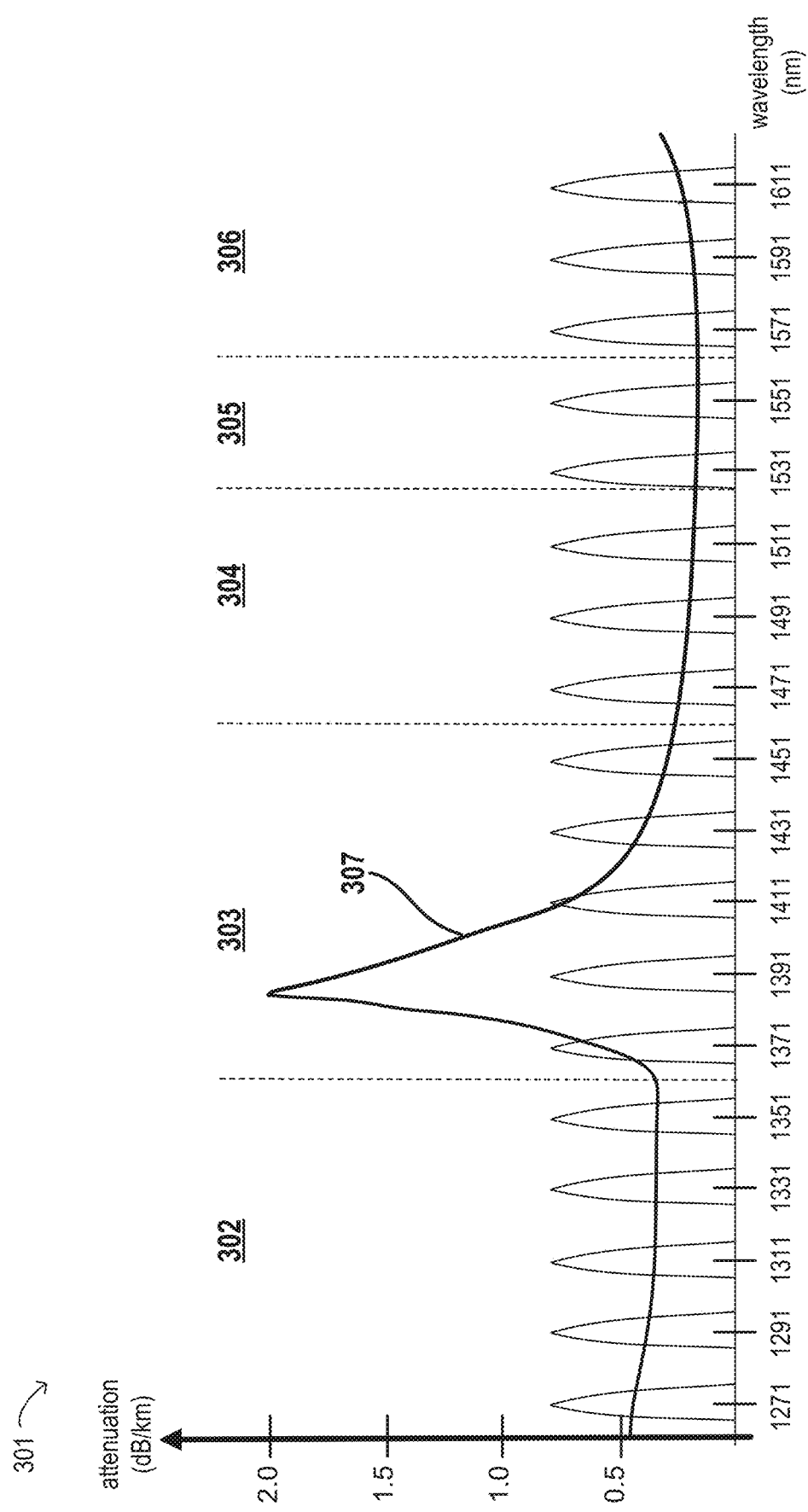
FIG. 3A is a graph illustrating five standard predefined optical wavelength bands.

FIG. 3A is a graph 301 illustrating five optical wavelength bands defined by the International Telecommunication Union Telecommunication Standardization Sector (ITU-T) and corresponding measurements of transmission performance in terms of attenuation. These predefined optical wavelength bands include the "Short wavelength" S-Band, shown as 304, comprising wavelengths between 1460 and 1530 nanometers, the "Conventional" C-Band, shown as 305, comprising wavelengths between 1530 and 1565 nanometers, and the "Long wavelength" L-Band, shown as 306, comprising wavelengths between 1565 and 1625 nanometers. The use of particular ones of these optical wavelength bands for telecommunication services may be more common in certain regions that in others. For example, carriers in North America typically use the C-Band to carry optical signal traffic. There are 96 channels in the C-Band, each corresponding to a respective wavelength between 1530 and 1565 nanometers. Each of the channels may typically operate at a data rate on the order of 100 Gbits/s, for a total of approximately 10 Terabits/s, or at a data rate of up to 200 Gbits/s, for a total of approximately 20 Terabits/s. Another commonly used optical wavelength band, e.g., in Japan, is the L-Band comprising wavelengths between 1565 and 1625 nanometers. The S-Band is also available for optical signal traffic, but it is not typically used for this purpose in existing optical networks.

The optical wavelength bands defined by the ITU-T also include additional optical wavelength bands not typically used for optical signal traffic. These include the "Original" O-Band, shown as 302, comprising wavelengths between 1260 and 1360 nanometers, and the "Extended" E-Band, shown in 303, comprising wavelengths between 1360 and 1460 nanometers. A sixth wavelength band defined by the ITU-T is the "Ultra-long wavelength" U-Band (not shown in FIG. 3A), which comprises wavelengths between 1625 and 1675 nanometers.

As shown by performance curve 307 in FIG. 3A, the performance of optical transmissions in the C-Band and in the L-Band are largely the same except that the L-Band has slightly poorer performance, i.e., slightly more attenuation, at the extreme right end of the band. The S-Band also exhibits reasonable transmission performance across the band with slightly poorer performance at the extreme left end of the band. By way of contrast, the E-Band performance exhibits a large water peak that renders it largely unusable.

Figure 3B:
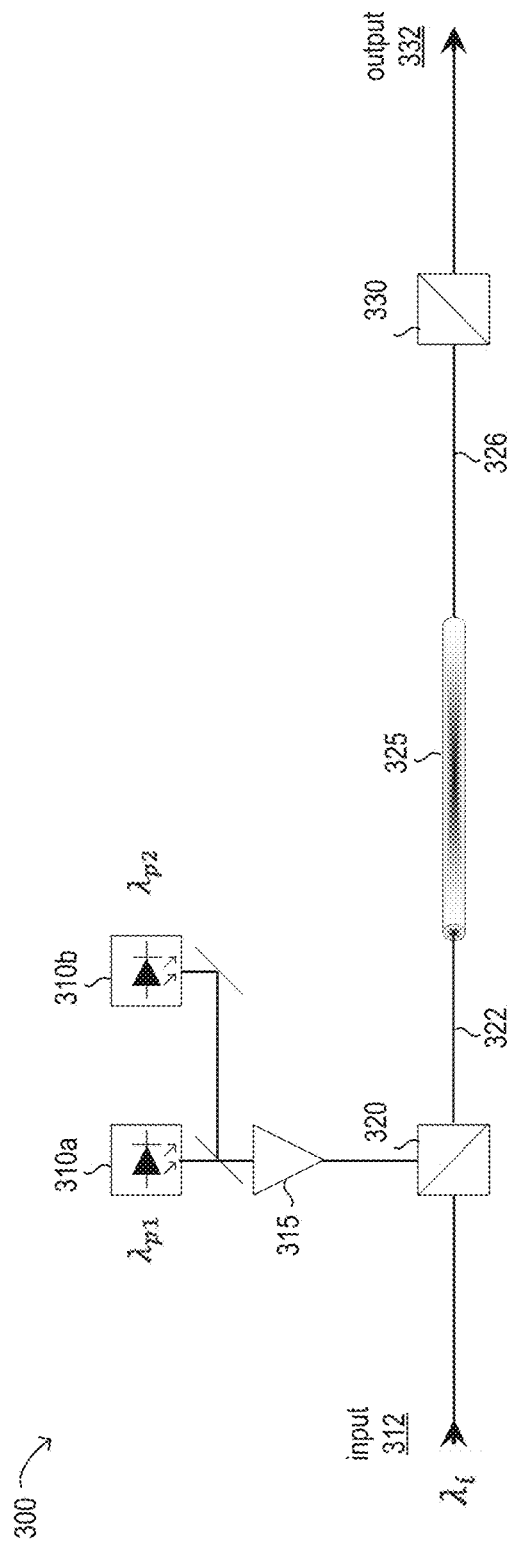
FIG. 3B is a block diagram illustrating selected elements of an embodiment of an optical wavelength converter.

FIG. 3B is a block diagram 300 illustrating selected elements of an embodiment of an optical wavelength converter. In the example embodiment illustrated in FIG. 3B, the wavelength converter includes two pump light sources 310 shown as pump light source 310a, which provides a light source having a wavelength $\lambda_{p1}$ and pump light source 310b, which provides a light source having a wavelength $\lambda_{p2}$. The wavelength converter also includes pump 315, polarization beam combiner 320, and a nonlinear medium 320. An input optical signal 312 having a wavelength) is combined, at polarization beam combiner 320, with the output of pump 315, resulting in the optical signal 322. Optical signal 322 then passes through nonlinear medium 325 where it is converted to an optical signal 326 in a different optical wavelength band than the input optical signal 312.

The nonlinear medium 325 may convert wavelengths within a first predefined optical wavelength band to respective wavelengths within a second predefined optical wavelength band. For example, the nonlinear medium 325 may be selected, fabricated, or configured to perform a desired wavelength conversion from a particular first one of the standard predefined optical wavelength bands (e.g., the C-Band, L-Band, or S-Band) to a particular second one of the standard predefined optical wavelength bands.

The converted optical signal 326 may be provided to polarization beam splitter 330, the output of which, shown as 332, includes two components. One component, i.e., the component of the converted signal having the shorter), may be represented mathematically as follows:

$$\lambda_{cs} = (\lambda_i^{-1} + |\lambda_{p1}^{-1} - \lambda_{p2}^{-1}|)^{-1}$$

A second component, i.e., the component of the converted signal having the longer), may be represented mathematically as follows:

$$\lambda_{cl} = (\lambda_i^{-1} + |\lambda_{p1}^{-1} - \lambda_{p2}^{-1}|)^{-1}$$

In other embodiments, a wavelength converter may include different components than those illustrated in FIG. 3B.

Figure 3C:
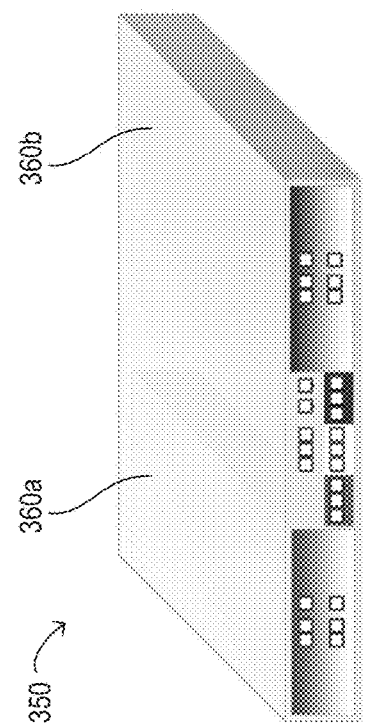
FIG. 3C illustrates an example wavelength converter device, in accordance with some embodiments.

FIG. 3C illustrates an example wavelength converter device 350 configured for wavelength converted signal generation, in accordance with some embodiments. In at least some embodiments, wavelength converter device 350 may have the ability to convert a C-Band signal into either an L-Band or an S-Band signal, or vice versa, as described herein. For example, wavelength converter device 350 may include a nonlinear medium, such as nonlinear medium 325 shown in FIG. 3B, that is selected, fabricated, or configured to receive a signal in the C-Band and, essentially, create a copy of the input optical signal, including its multiple composite wavelengths, in either the L-Band or the S-Band.

In the illustrated embodiment, a wavelength converter device 350 at a source location includes two different wavelength conversion units 360, one of which is configured to convert optical signal traffic from the C-Band to the L-Band, and one of which is configured to convert optical signal traffic from the C-Band to the S-Band. A complimentary wavelength converter device at a destination location may be configured to reverse the conversion performed by wavelength converter device 350. For example, the wavelength converter device at the destination location may convert optical signal traffic from the L-Band or S-Band back to the C-Band.

Other wavelength conversions are possible, in other embodiments. In general, a wavelength converter device 350 may be configured to convert optical signal traffic between any two of the C-Band, the S-Band, and the L-Band, in different embodiments. In one embodiment, a wavelength converter device 350 may be configured to convert optical signal traffic on a primary path between source and destination locations from the L-Band to the C-Band in response to a fiber cut or other fiber failure on the primary path.

Figure 4:
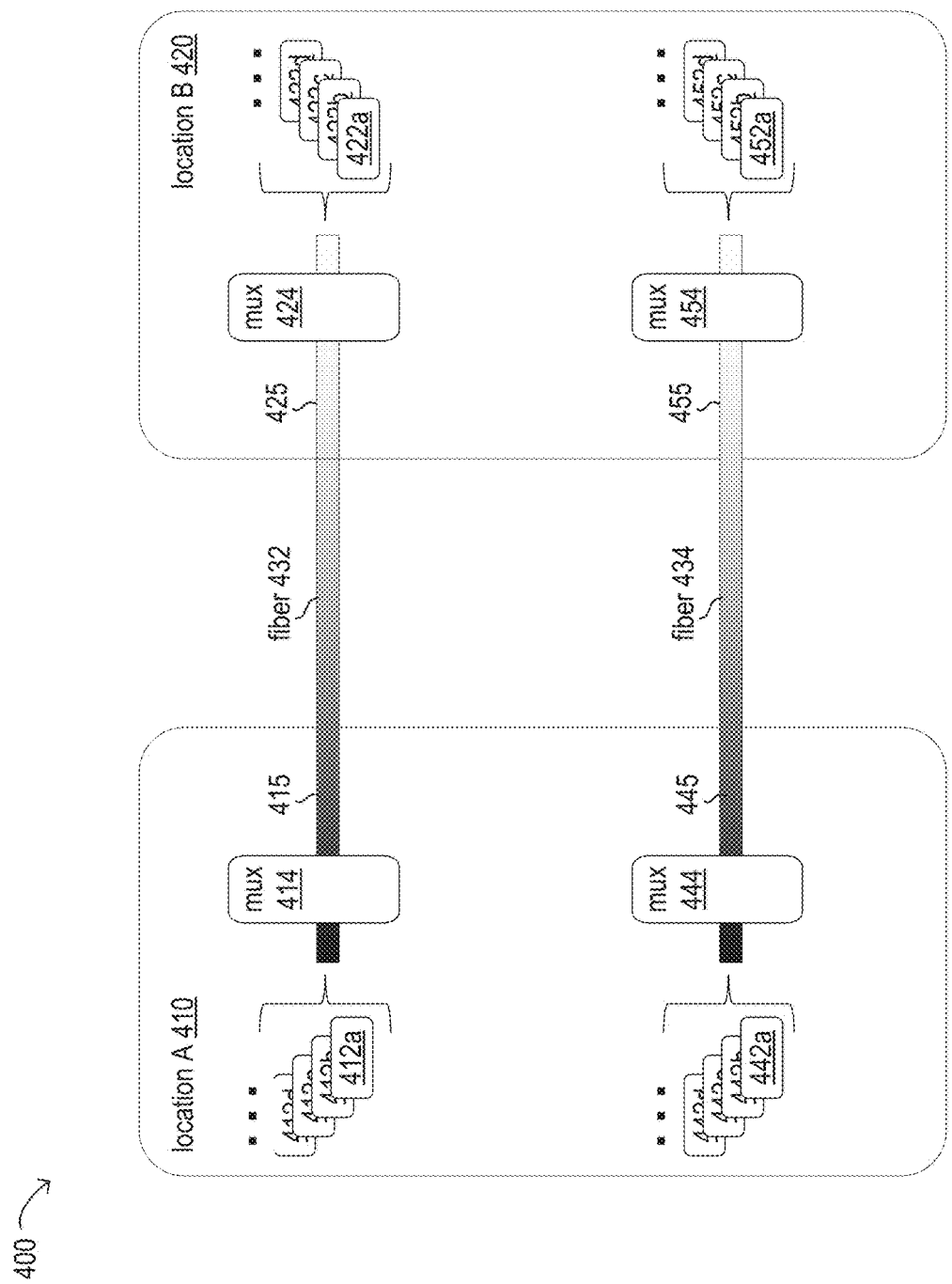
FIG. 4 is a block diagram illustrating selected elements of an optical network including two fiber cables between a pair of locations, in accordance with some embodiments.

FIG. 4 is a block diagram illustrating selected elements of an optical network 400 including two fiber cables that serve as links between two locations, in accordance with some embodiments. In FIG. 4, the two fiber cables are shown as unprotected links prior to the application of the techniques described herein for providing optical path protection in optical networks using wavelength conversion. Here, the optical signal traffic carried over both fiber 432 and fiber 434 comprises optical signals having wavelengths within a single standard predefined wavelength band.

In the illustrated example, optical network 400 includes, at location A (410), multiple transponders 442 and a multiplexer 444 and, at location B (420), multiple transponders 452 and a multiplexer 454. In this example embodiment, optical signal traffic may be exchanged between the transponders 442 at location A (410) and the transponders 452 at location B (420) over a first fiber cable, shown as fiber 434. For example, each of the transponders may be configured to generate and/or receive optical signals having a respective one of the wavelengths defined within a first predefined optical wavelength band (e.g., within the C-Band) at different times. In other embodiments, there may be separate optical transmitters and receivers at each of location A (410) and location B (420) for each such wavelength. In this example, because there are 96 wavelengths defined within the C-Band, there may be 96 transponders 442, i.e., one transponder 442 for each wavelength within the C-Band, that collectively generate optical signal traffic for transmission over fiber 434, and 96 transponders 452 that collectively receive optical signal traffic generated by transponders 442 over fiber 434. The outputs of the transponders 442 are input to multiplexer 444, the output of which is shown as first optical signal traffic 445, which contains all 96 wavelengths of the C-Band. In the illustrated example, the first optical signal traffic 445 is carried over fiber 434 and received at location B (420) as received optical signal traffic 455. The received optical signal traffic 455 is provided to multiplexer 454 for demultiplexing into the 96 wavelengths of the C-Band, each of which is provided to a respective one of the 96 transponders 452.

In the illustrated embodiment, optical network 400 also includes, at location A (410), multiple transponders 412 and a multiplexer 414 and, at location B (420), multiple transponders 422 and a multiplexer 424. In this example embodiment, optical signal traffic may be exchanged between the transponders 412 at location A (410) and the transponders 422 at location B (420) over a second fiber cable, shown as fiber 432. Here again, each of the transponders may be configured to generate and/or receive optical signals having a respective one of the wavelengths defined within the first predefined optical wavelength band (e.g., within the C-Band), at different times. However, in other embodiments, there may be separate optical transmitters and receivers at each of location A (410) and location B (420) for each such wavelength. In this example, because there are 96 wavelengths defined within the C-Band, there may be 96 transponders 412, i.e., one transponder 412 for each wavelength within the C-Band, that collectively generate optical signal traffic for transmission over fiber 432, and 96 transponders 422 that collectively receive optical signal traffic generated by transponders 412 over fiber 432. The outputs of the transponders 412 are input to multiplexer 414, the output of which is shown as second optical signal traffic 415, which contains all 96 wavelengths of the C-Band. In the illustrated example, the second optical signal traffic 415 is carried over fiber 432 and received at location B (420) as received optical signal traffic 425. The received optical signal traffic 425 is provided to multiplexer 424 for demultiplexing into the 96 wavelengths of the C-Band, each of which is provided to a respective one of the 96 transponders 422.

Figure 5:
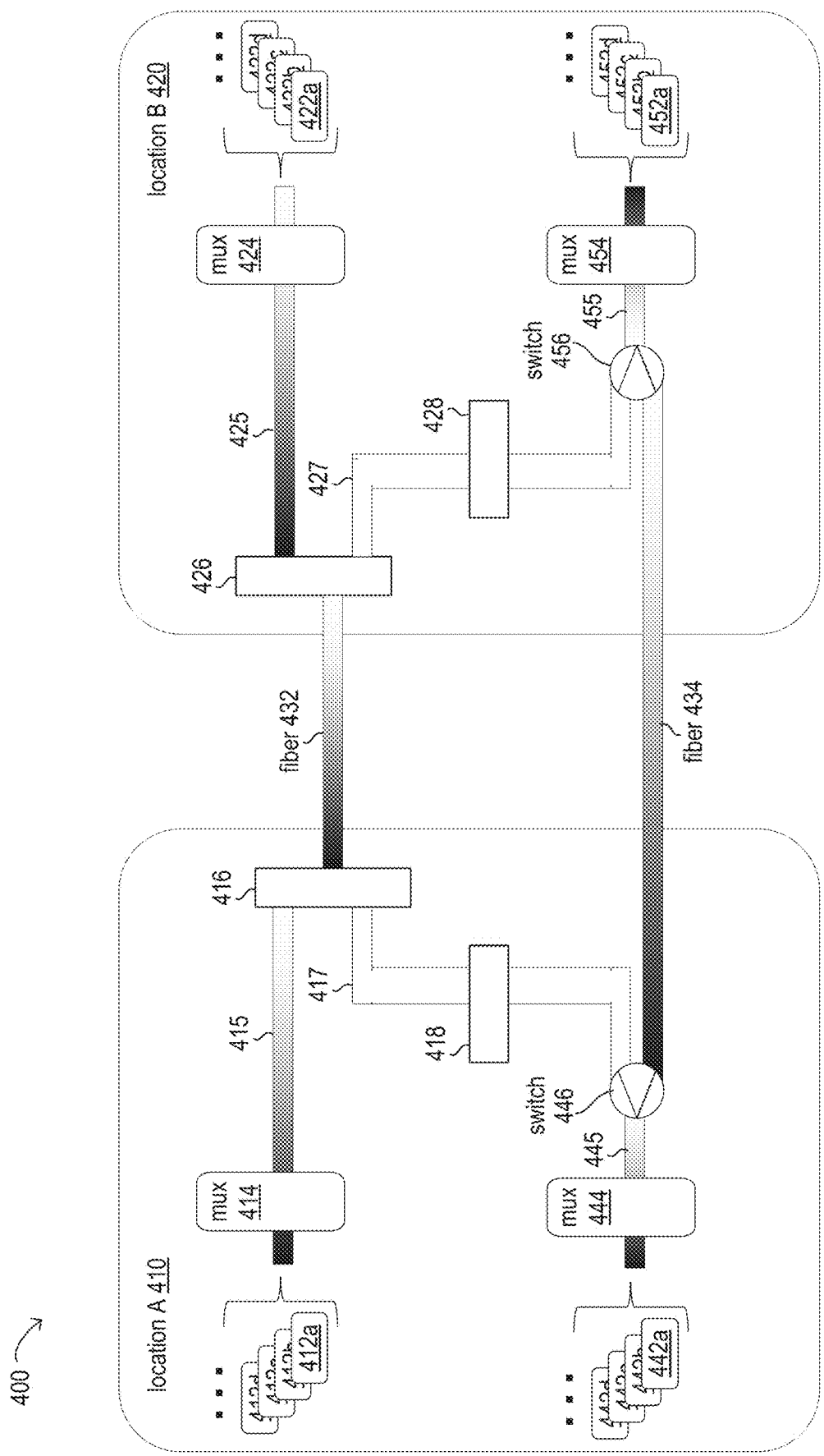
FIG. 5 is a block diagram illustrating selected elements of the optical network illustrated in FIG. 4 with the addition of two wavelength converters, in accordance with some embodiments.

FIG. 5 is a block diagram illustrating selected elements of the optical network 400 illustrated in FIG. 4 with the addition of two wavelength converters, in accordance with some embodiments. More specifically, a wavelength converter 418 is added at location A (410) and a wavelength converter 428 is added at location B (420). As described below, fiber 432 provides path protection for fiber 434 while neither fiber 432 nor fiber 434 is reserved (i.e., unused) during normal operation. In addition, a band combiner 416 and an optical switch 446 are added at location A (410) and a band splitter 426 and an optical switch 456 are added at location B (420). In at least some embodiments, one or both of band combiner 416 and band splitter 426 may be configured to perform both band combining and band splitting functions, at various times. For example, in embodiments in which optical signal traffic is transmitted bidirectionally, a band combiner/splitter 416 may act as a band combiner and a band combiner/splitter 426 may act as a band splitter for optical traffic transmitted from location A (410) to location B (420). However, the band combiner/splitter 416 may act as a band splitter and the band combiner/splitter 426 may act as a band combiner for optical traffic transmitted from location B (420) to location A (410).

In the illustrated embodiment, optical switch 446 at location A (410) may monitor traffic over fiber 434 and may be programmed such that the preferred path through the switch is the path on which optical signal traffic 445 generated by transponders 442 at location A (410) is provided to fiber 434 without first being converted to the L-Band. While there is no interruption in the exchange of optical signal traffic 445 over fiber 434, optical switch 446 may maintain this selection of the preferred path. However, if and when optical switch 446 detects that there has been an interruption in the exchange of optical signal traffic 445 over fiber 434, optical switch 446 may select the alternate path through the switch, routing optical signal traffic 445 to wavelength converter 418. Subsequently, if optical signal traffic is observed on fiber 434, optical switch 446 may again select the preferred path for optical signal traffic 445. Similarly, optical switch 456 at location B (420) may monitor traffic over fiber 434 and may be programmed such that the preferred path through the switch is the path on which optical signal traffic 455 is received over fiber 434. While there is no interruption in the exchange of optical signal traffic 445 over fiber 434, optical switch 456 may maintain this selection of the preferred path. However, if and when optical switch 456 detects that there has been an interruption in the exchange of optical signal traffic 445 over fiber 434, optical switch 456 may select the alternate path through the switch, routing optical signal traffic 455 from wavelength converter 428 to multiplexer 454. Subsequently, if optical signal traffic is observed on fiber 434, optical switch 456 may again select the preferred path for receiving optical signal traffic 445. In various embodiments, optical switches 446 and 456 may be or include any custom or commercially available optical switches suitable for performing the switching functions described herein.

As illustrated in FIG. 5, until and unless an interruption in the exchange of optical signal traffic over fiber 434 occurs and is detected, the optical signal traffic 445 output by multiplexer 444 based on optical signals generated by transponders 442 may pass through optical switch 446 to be transmitted from location A (410) to location B (420) over fiber 434 as optical signals having wavelengths within the C-Band. In addition, the optical signal traffic 415 output by multiplexer 414 based on optical signals generated by transponders 412 may pass directly through band combiner 416 unchanged to be transmitted from location A (410) to location B (420) over fiber 432 as optical signals having wavelengths within the C-Band. In this case, in which there is no interruption in the exchange of optical signal traffic over fiber 434, optical switch 446 may select fiber 434 to carry the optical signal traffic 445 to location B (420) and optical switch 456 may select fiber 434 as the fiber from which to receive the optical signal traffic at location B (420) to be provided to multiplexer 454. In addition, band splitter 426 may be configured to receive optical signal traffic 415 over fiber 432 and pass this traffic to multiplexer 424 unchanged as optical signal traffic 425.

In the illustrated embodiment, when and if wavelength converter 418 receives optical signal traffic 445 through optical switch 446 (e.g., if fiber 434 is cut or otherwise fails), wavelength converter 418 may be configured to convert optical signal traffic 445, which comprises optical signals having wavelengths within the C-Band, to optical signal traffic 417, which comprises optical signals having wavelengths within the L-Band. In this case, wavelength converter 428 may be configured to convert received optical signal traffic 427, which comprises optical signals having wavelengths within the L-Band, to optical signal traffic comprising optical signals having wavelengths within the C-Band, and optical switch 456 my route this converted optical signal traffic to multiplexer 454 as optical signal traffic 455.

In some embodiments, such as in the embodiment illustrated in FIG. 5, wavelength converter 418 may not receive optical signal traffic 445 and convert optical signal traffic to optical signal traffic 417 until and unless an interruption in the exchange of optical signal traffic over fiber 434 occurs and is detected by optical switch 446. In other embodiments, optical signal traffic 445 may be provided to wavelength converter 418 for preemptive conversion of the optical signal traffic 445 to optical signal traffic 417 (not shown). In this case, a splitter may replace switch 446 shown in FIG. 5 to simultaneously route optical signal traffic 445 toward fiber 434 and wavelength converter 418 and an optical switch between wavelength converter 418 and band combiner 416 may control when and whether the converted optical signal traffic 417 is provided to band combiner 416.

Figure 7:
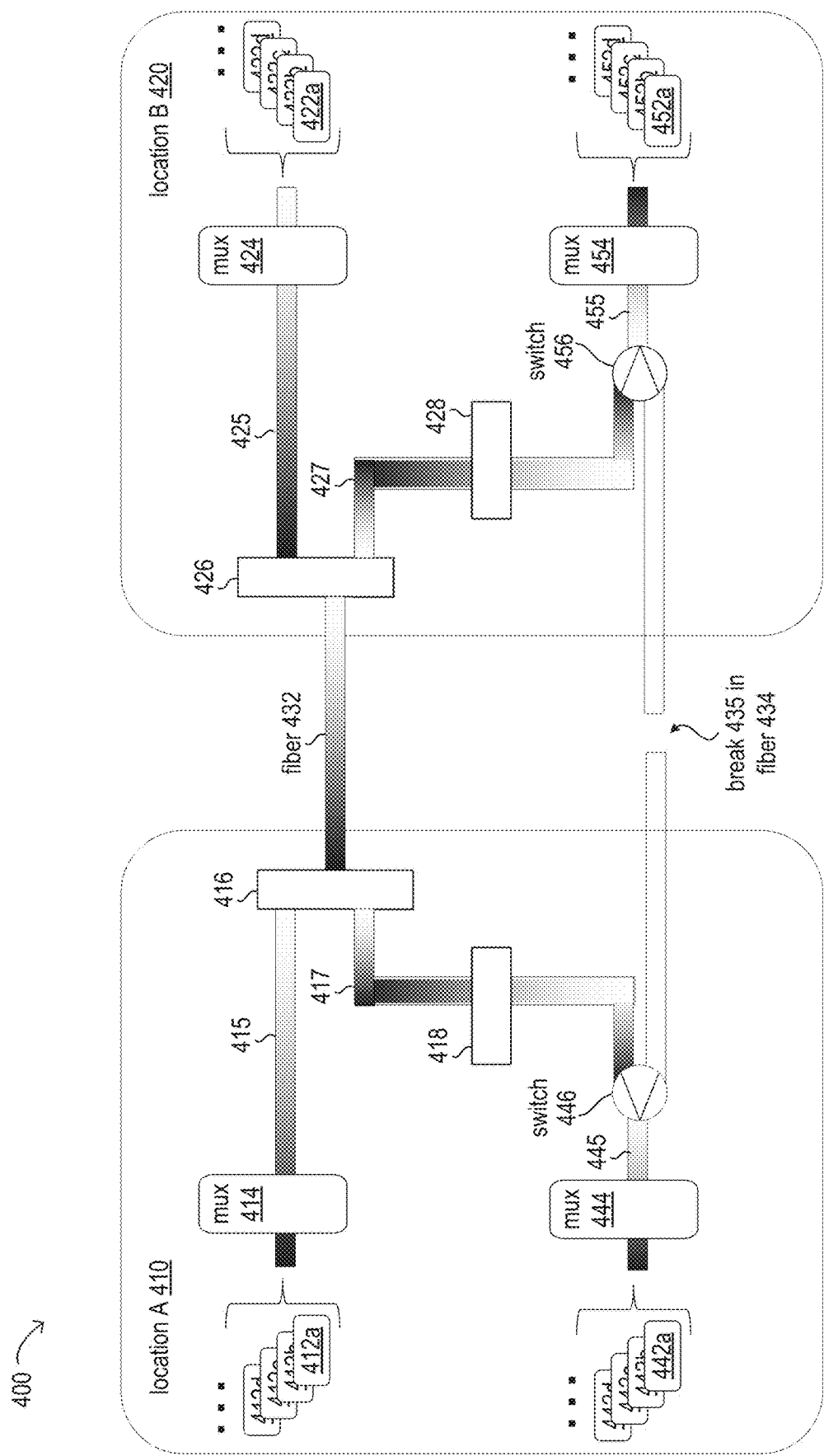
FIG. 7 is a block diagram illustrating selected elements of the optical network illustrated in FIG. 5 following a break in one of the fiber cables, in accordance with some embodiments.

In at least some embodiments, including in the embodiments illustrated in FIGS. 4, 5, and 7, all of the components shown as residing at location A (410), including transponders 412 and 442, multiplexers 414 and 444, optical switch 446, wavelength converter 418, and band combiner 416, may be physically co-located within a central physical location that is the source for the two paths between location A (410) and location B (420) traversed by fibers 432 and 434. Similarly, all of the components shown as residing at location B (420), including transponders 422 and 452, multiplexers 424 and 454, optical switch 456, wavelength converter 428, and band splitter 426, may be physically co-located within a central physical location that is the destination for the two paths between location A (410) and location B (420) traversed by fibers 432 and 434.

Figure 6:
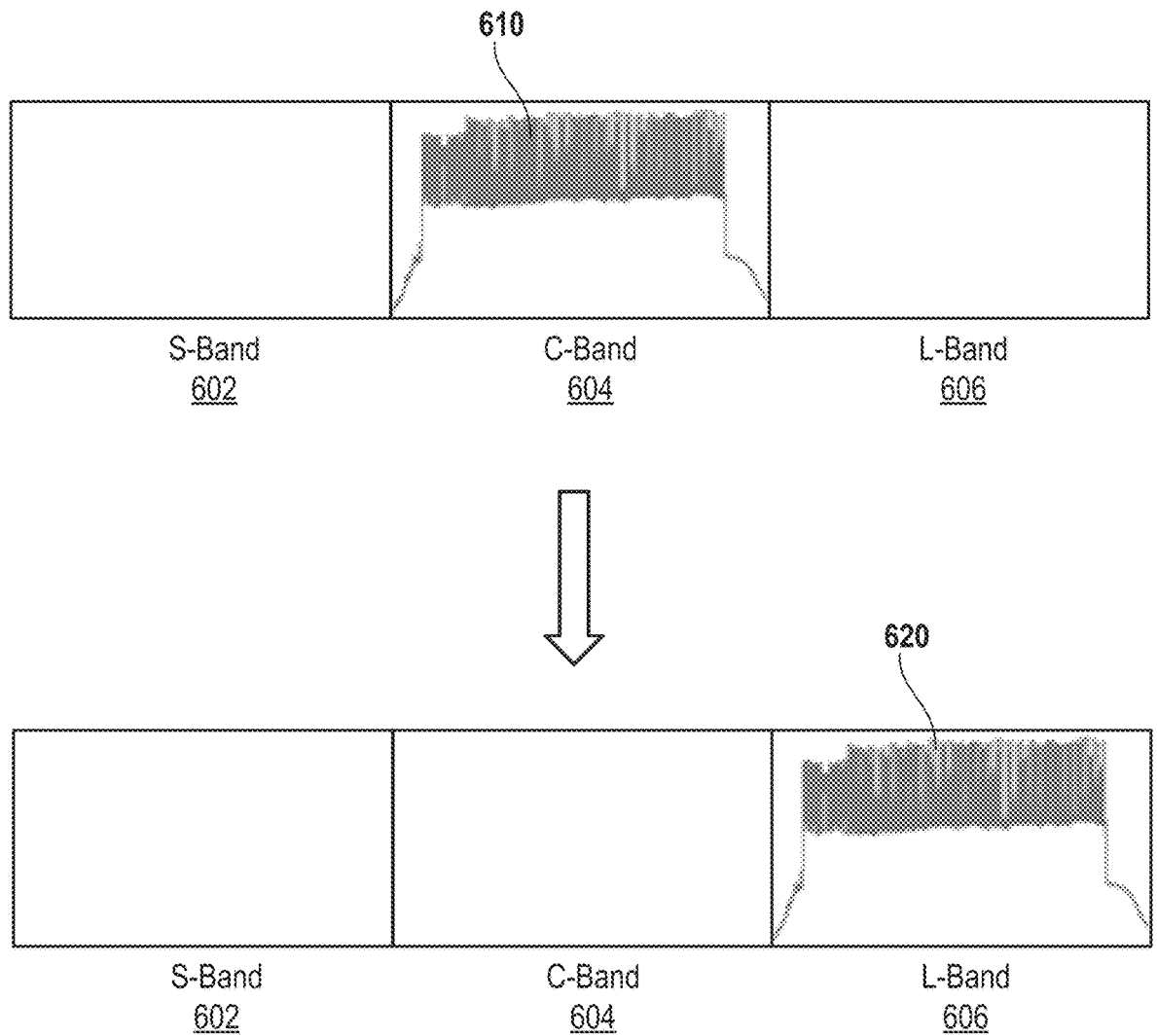
FIG. 6 illustrates an example wavelength conversion, in accordance with some embodiments.

FIG. 6 illustrates an example wavelength conversion, in accordance with some embodiments. In this example, prior to the optical signal traffic 610 passing through a wavelength converter, there is no activity in the S-Band, shown as 602, and no activity in the L-Band, shown as 606. Optical signal traffic 610 represents a multiplexed collection of optical signals each generated by a corresponding transponder and each having a respective wavelength within the C-Band. More specifically, optical signal traffic 610 includes 96 discrete wavelengths that form a spectrum pattern. In this example, optical signal traffic 610 passes through the wavelength converter, as represented in FIG. 6 by the downward arrow, thus creating an exact copy of the spectrum pattern formed by the input optical signal traffic 610, shown as optical signal traffic 620, which has been moved to the L-Band. More specifically, in the illustrated example, optical signal traffic 620 includes the same number of optical signals as optical signal traffic 610, but each of the optical signals in optical signal traffic 620 has a wavelength within the L-Band rather than a wavelength within the C-Band. In the illustrated example, subsequent to the optical signal traffic 610 passing through the wavelength converter, there is no activity in the S-Band, shown as 602, and no activity in the C-Band, shown as 604.

FIG. 7 is a block diagram illustrating selected elements of the optical network 400 illustrated in FIG. 5 following a break in one of the fiber cables, in accordance with some embodiments. More specifically, FIG. 7 illustrates the operation of wavelength converters 418 and 428, band combiner 416, band splitter 426, and optical switches 446 and 456 in response to a break 435 in fiber 434.

In this example, optical switch 446 at location A (410) may detect the break 435 in fiber 434 as an interruption in the exchange of optical signal traffic over fiber 434 and, in response to the detection, may cause optical signal traffic 445 to be provided to wavelength converter 418. Wavelength converter 418 may be configured to convert optical signal traffic 445, which comprises optical signals having wavelengths within the C-Band, to optical signal traffic 417, which comprises optical signals having wavelengths within the L-Band. In this example, optical signal traffic 417 is provided as a second input to band combiner 416 along with optical signal traffic 415. Band combiner 416 may be configured to merge optical signal traffic 415, which comprises optical signals having wavelengths within the C-Band, with optical signal traffic 417, which comprises optical signals having wavelengths within the L-Band, for transmission over fiber 432.

In this example, band splitter 426 at location B (420) may be configured to receive the merged optical signal traffic over fiber 432 and to extract the portion of the merged optical signal traffic having wavelengths within the C-Band, shown as optical signal traffic 425, and the portion of the merged optical signal traffic having wavelengths within the L-Band, shown as optical signal traffic 427. Multiplexer 424 may be configured to receive optical signal traffic 425 from band splitter 426 and to demultiplex optical signal traffic 425 into the 96 wavelengths of the C-Band, each of which is provided to a respective one of the 96 transponders 422. Wavelength converter 428 may receive optical signal traffic 427 from band splitter 426 and may be configured to convert optical signal traffic 427, which comprises optical signals having wavelengths within the L-Band, to optical signal traffic 455, which comprises optical signals having wavelengths within the C-Band. The converted optical signal traffic 455 may then be provided to multiplexer 454 through optical switch 456 for demultiplexing into the 96 wavelengths of the C-Band, each of which is provided to a respective one of the 96 transponders 452.

In some embodiments, there may be a brief interruption, e.g., on the order of a few milliseconds, in the exchange of optical signal traffic 445 following the occurrence of the break 435 in fiber 434 before the path protection mechanisms described herein are switched in and begin functioning to convert the optical signal traffic 445 to the L-Band and transmit it to location B (420) over fiber 432 and subsequent reconversion to the C-Band by wavelength converter 428. However, once this switch is made, there may be no effect on the transmission of the optical signal traffic 445 from location A (410) to location B (420) from the perspective of the transponders 452 at location B (420).

Figure 8:
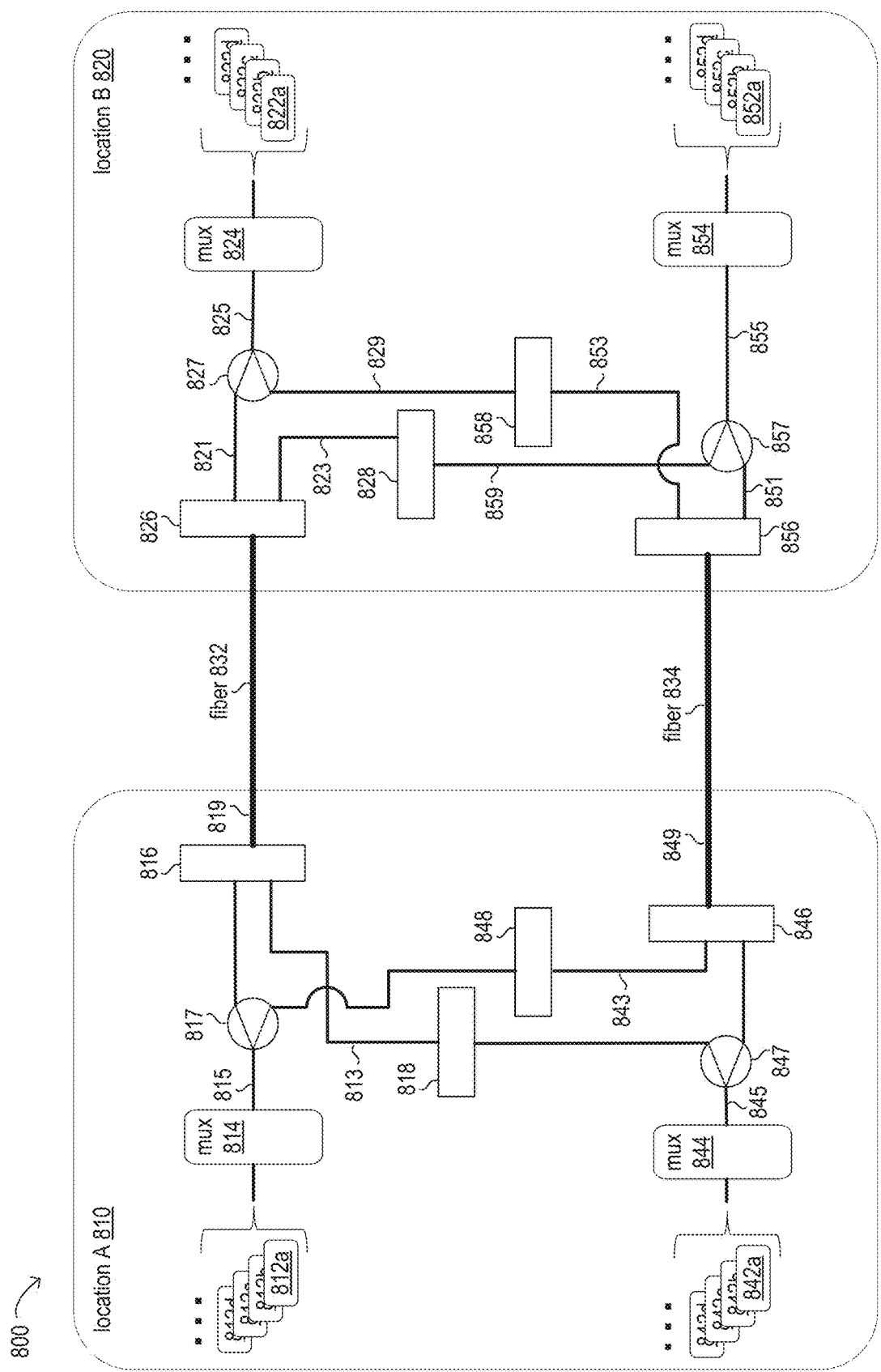
FIG. 8 is a block diagram illustrating selected elements of an optical network in which wavelength conversion is used to provide protection for optical paths on two fiber cables, in accordance with some embodiments.

In some embodiments, the path protection techniques described herein may allow each of two of more fiber cables to provide path protection for others of the two or more fiber cables. For example, FIG. 8 is a block diagram illustrating selected elements of an optical network 800 in which wavelength conversion is used to provide protection for optical paths on two fiber cables that serve as links between two locations, in accordance with some embodiments. In the illustrated embodiment, fiber 832 may be used to protect fiber 834 using wavelength conversion or, alternatively, fiber 834 may be used to protect fiber 832 using wavelength conversion.

In the illustrated example, optical network 800 includes, at location A (810), multiple transponders 842 and a multiplexer 844 and, at location B (820), multiple transponders 852 and a multiplexer 854. In this example embodiment, absent a fiber failure, optical signal traffic may be exchanged between the transponders 842 at location A (810) and the transponders 852 at location B (820) over a first fiber cable, shown as fiber 834. In the illustrated example, each of the transponders may be configured to generate and/or receive optical signals having a respective one of the wavelengths defined within a first predefined optical wavelength band (e.g., within the C-Band), at various times. In other embodiments, there may be separate optical transmitters and receivers at each of location A (810) and location B (820) for each such wavelength. In this example, because there are 96 wavelengths defined within the C-Band, there may be 96 transponders 842, i.e., one transponder 842 for each wavelength within the C-Band, that collectively generate optical signal traffic for transmission over one of the fibers 834 and 832, and 96 transponders 852 that collectively receive optical signal traffic generated by transponders 842 over one of the fibers 834 and 832. The outputs of the transponders 842 are input to multiplexer 844, the output of which is shown as first optical signal traffic 845, which contains all 96 wavelengths of the C-Band.

In the illustrated embodiment, optical network 800 also includes, at location A (810), multiple transponders 812 and a multiplexer 814 and, at location B (820), multiple transponders 822 and a multiplexer 824. In this example embodiment, absent a fiber failure, optical signal traffic may be exchanged between the transponders 812 at location A (810) and the transponders 822 at location B (820) over a second fiber cable, shown as fiber 832. In this example, each of the transponders may be configured to generate and/or receive optical signals having a respective one of the wavelengths defined within a first predefined optical wavelength band (e.g., within the C-Band), at various times. In other embodiments, there may be separate optical transmitters and receivers at each of location A (810) and location B (820) for each such wavelength. In this example, because there are 96 wavelengths defined within the C-Band, there may be 96 transponders 812, i.e., one transponder 812 for each wavelength within the C-Band, that collectively generate optical signal traffic for transmission over one of the fibers 834 and 832, and 96 transponders 822 that collectively receive optical signal traffic generated by transponders 812 over one of the fibers 834 and 832. The outputs of the transponders 812 are input to multiplexer 814, the output of which is shown as second optical signal traffic 815, which contains all 96 wavelengths of the C-Band.

In the illustrated example, optical network 800 includes, at location A (810), wavelength converters 818 and 848, band combiners 816 and 846, and optical switches 817 and 847. Similarly, optical network 800 includes, at location B (820), wavelength converters 828 and 858, band combiners 826 and 856, and optical switches 827 and 857. In at least some embodiments, one or more of band combiners 816, 826, 846, and 856 may be configured to perform both band combining and band splitting functions. In other embodiments, elements 816 and 846 may provide only band combining functionality at location A (810), elements 826 and 856 may provide only band splitting functionality at location B (820), and additional elements (not shown in FIG. 8) may provide band splitting functionality at location A (810) and band combining functionality at location B (820), e.g., for optical signal traffic transmitted from location B (820) to location A (810).

In the example embodiment illustrated in FIG. 8, until and unless an interruption in the exchange of optical signal traffic over one of the fibers 832 and 834 occurs and is detected, the optical signal traffic 845 output by multiplexer 844 based on optical signals generated by transponders 842 may pass through optical switch 847 and band combiner 846 unchanged, after which it may be transmitted as optical signal traffic 849 from location A (810) to location B (820) over fiber 834. In this case, optical signal traffic 849 may be identical to optical signal traffic 845 and may include information representing optical signal traffic 845 as optical signals having wavelengths only within the C-Band. Similarly, absent an interruption in the exchange of optical signal traffic over one of the fibers 832 and 834, the optical signal traffic 815 output by multiplexer 814 based on optical signals generated by transponders 812 may pass through optical switch 817 and band combiner 816 unchanged to be transmitted as optical signal traffic 819 from location A (810) to location B (820) over fiber 832, In this case, optical signal traffic 819 may be identical to optical signal traffic 815 and may include information representing optical signal traffic 815 as optical signals having wavelengths only within the C-Band. In these examples, in which there is no interruption in the exchange of optical signal traffic over either of the fibers 832 or 834, optical switch 847 may select the unchanged optical signal traffic 845 to be provided to band combiner 846 and subsequently transmitted as optical signal traffic 849 to location B (820) over fiber 834. Band combiner 856 may receive the optical signal traffic 849 at location B (820) and pass it unchanged to optical switch 857 as optical signal traffic 851, after which optical switch 857 may provide the received optical signal traffic 851 to multiplexer 854 as optical signal traffic 855. Similarly, optical switch 817 may select the unchanged optical signal traffic 815 to be provided to band combiner 816 and subsequently transmitted as optical signal traffic 819 to location B (820) over fiber 832. Band combiner/splitter 826 may receive the optical signal traffic 819 at location B (820) and pass it unchanged to optical switch 827 as optical signal traffic 821, after which optical switch 827 may provide the received optical signal traffic 821 to multiplexer 824 as optical signal traffic 825.

In the example embodiment illustrated in FIG. 8, when and if an interruption in the exchange of optical signal traffic 845 over fiber 834 occurs, it may be detected by optical switches 847 and 857, as no optical signal traffic will be provided to nor received by band combiner 846 or band combiner/splitter 856. In this case, optical switch 847 may reroute optical signal traffic 845 to wavelength converter 818. Wavelength converter 818 may be configured to convert optical signal traffic 845, which comprises optical signals having wavelengths within the C-Band, to optical signal traffic 813, which comprises optical signals having wavelengths within the L-Band. Optical signal traffic 813 may be provided as an input to band combiner 816 along with optical signal traffic 815, and the output of band combiner 816, shown as optical signal traffic 819, may be transmitted to location B (820) over fiber 832. In this example, optical signal traffic 819 may include optical signals having wavelengths in the C-band representing optical signal traffic 815 and optical signals having wavelengths in the L-band representing optical signal traffic 845. In this case, band combiner/splitter 826 may receive the merged optical signal traffic 819 at location B (820) and extract the portion of the merged optical signal traffic 819 having wavelengths within the C-Band, shown as optical signal traffic 821, and the portion of the merged optical signal traffic 819 having wavelengths within the L-Band, shown as optical signal traffic 823, routing the extracted portions to optical switch 827 and wavelength converter 828, respectively. Wavelength converter 828 may be configured to convert optical signal traffic 823, which comprises optical signals having wavelengths within the L-Band, to optical signal traffic 859, which comprises optical signals having wavelengths within the C-Band. Optical signal traffic 859 may then be provided to optical switch 857, the output of which is provided as optical signal traffic 855 to multiplexer 854. In this case, optical signal traffic 855 may include optical signals having wavelengths in the C-band representing optical signal traffic 845. In this example, optical switch 827 may provide the received optical signal traffic 821 to multiplexer 824 as optical signal traffic 825. In this case, optical signal traffic 825 comprises optical signals having wavelengths in the C-band representing optical signal traffic 815.

Conversely, when and if an interruption in the exchange of optical signal traffic 815 over fiber 832 occurs, it may be detected by optical switches 817 and 827, as no optical signal traffic will be provided to nor received by band combiner 816 or band combiner/splitter 826. In this case, optical switch 817 may reroute optical signal traffic 815 to wavelength converter 848. Wavelength converter 848 may be configured to convert optical signal traffic 815, which comprises optical signals having wavelengths within the C-Band, to optical signal traffic 843, which comprises optical signals having wavelengths within the L-Band. Optical signal traffic 843 may be provided as an input to band combiner 846 along with optical signal traffic 845, and the output of band combiner 846, shown as optical signal traffic 849, may be transmitted to location B (820) over fiber 834. In this example, optical signal traffic 849 may include optical signals having wavelengths in the C-band representing optical signal traffic 845 and optical signals having wavelengths in the L-band representing optical signal traffic 815. In this case, band combiner/splitter 856 may receive the merged optical signal traffic 849 at location B (820) and extract the portion of the merged optical signal traffic 849 having wavelengths within the C-Band, shown as optical signal traffic 851, and the portion of the merged optical signal traffic 849 having wavelengths within the L-Band, shown as optical signal traffic 853, routing the extracted portions to optical switch 857 and wavelength converter 858, respectively. Wavelength converter 858 may be configured to convert optical signal traffic 853, which comprises optical signals having wavelengths within the L-Band, to optical signal traffic 829, which comprises optical signals having wavelengths within the C-Band. Optical signal traffic 829 may then be provided to optical switch 827, the output of which is provided as optical signal traffic 825 to multiplexer 824. In this case, optical signal traffic 825 may include optical signals having wavelengths in the C-band representing optical signal traffic 815. In this example, optical switch 857 may provide the received optical signal traffic 851 to multiplexer 854 as optical signal traffic 855. In this case, optical signal traffic 855 comprises optical signals having wavelengths in the C-band representing optical signal traffic 845.

In some embodiments in which more than two fiber cables traverse respective paths between a source location and a destination location, the path protection techniques described herein may be used to provide path protection for these paths in a round robin type arrangement. For example, if there are three such paths, a first path between the source and destination locations may provide path protection for a second path between the source and destination locations, the second path between the source and destination locations may provide path protection for a third path between the source and destination locations, and the third path between the source and destination locations may provide path protection for the first path between the source and destination locations.

Note that while FIGS. 4, 5, 7, and 8 illustrate the use of path protection techniques for unidirectional optical signal traffic, in some embodiments these techniques may be applied to provide path protection for bidirectional optical signal traffic. For example, in some embodiments, wavelength converters at a location A may be configured to convert optical signal traffic from a first predefined optical wavelength band to a second predefined optical signal wavelength band for transmission to location B and to convert optical signal traffic received from location B from the second predefined optical wavelength band to the first predefined optical signal wavelength band. Similarly, each of the wavelength converters at location B may be configured to convert optical signal traffic from the first predefined optical wavelength band to the second predefined optical signal wavelength band for transmission to location A and to convert optical signal traffic received from location A from the second predefined optical wavelength band to the first predefined optical signal wavelength band. In other embodiments, one or more wavelength converters at each location may be configured to convert optical signal traffic from the first predefined optical wavelength band to the second predefined optical signal wavelength band for transmission and one or more other wavelength converters at each location may be configured to convert received optical signal traffic from the second predefined optical wavelength band to the first predefined optical signal wavelength band. While several example embodiments are described herein in which optical signal traffic comprising optical signals having wavelengths within the C-Band is converted to optical signal traffic comprising optical signals having wavelengths within the L-Band, other wavelength conversions are possible, in other embodiments. In general, a wavelength converter device such as those described herein may be configured to convert optical signal traffic between any two of the C-Band, the S-Band, and the L-Band, in different embodiments.

Figure 9:
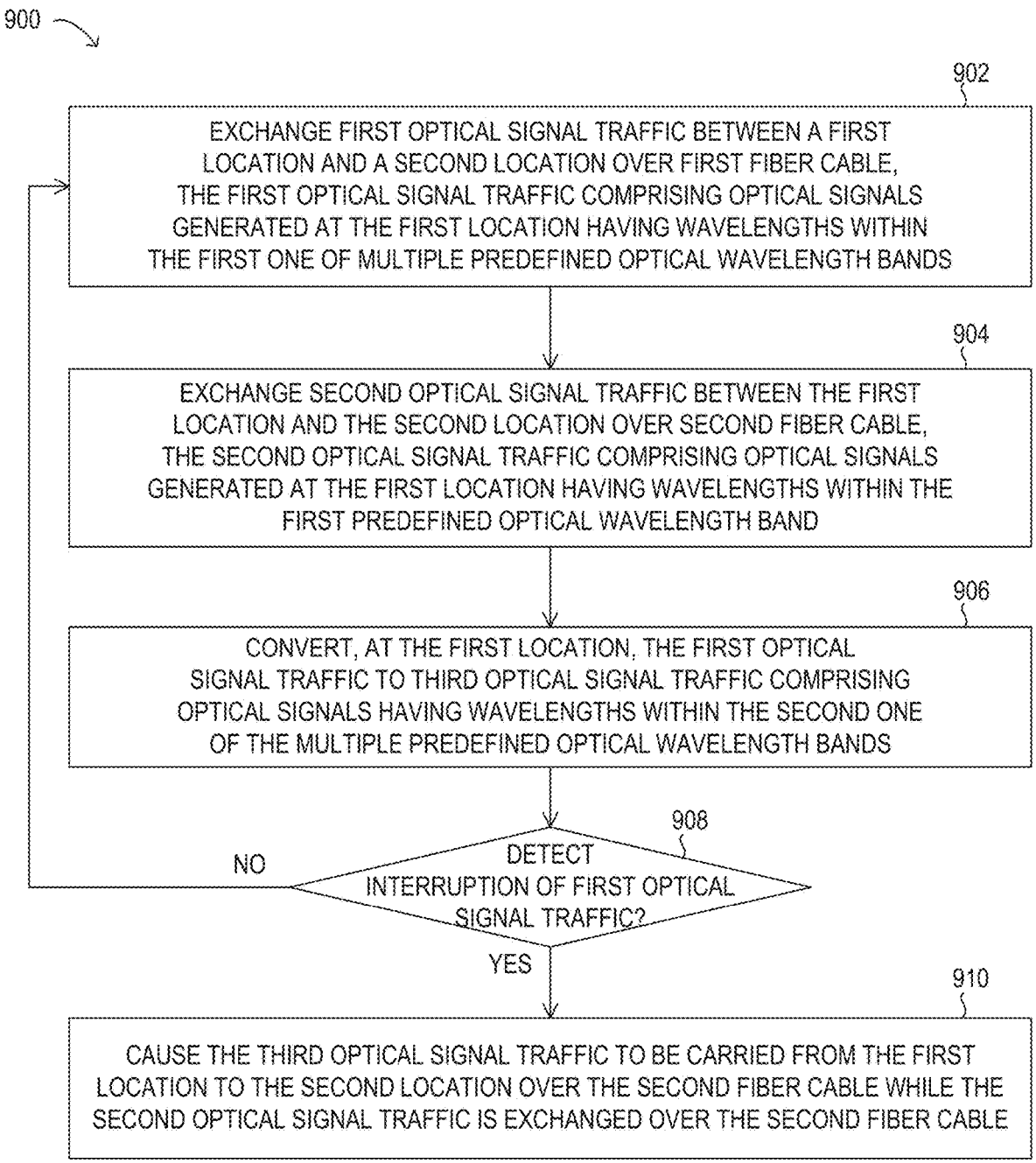
FIG. 9 is a flow chart of selected elements of a method for protecting optical paths using wavelength conversion, in accordance with some embodiments.

Referring now to FIG. 9, a block diagram of selected elements of an embodiment of a method 900 for protecting optical paths using wavelength conversion, as described herein, is depicted in flowchart form. In some embodiments, some or all of the operations of method 900 depicted in FIG. 9 may be performed by components of an optical network including, but not limited to, any of the components illustrated in FIG. 1, 2, 3B, 3C, 4, 5, 7, or 8. It is noted that certain operations described in method 900 may be optional or may be rearranged in different embodiments.

Method 900 may begin, at 902, by beginning to exchange first optical signal traffic between a first location and a second location in an optical network over a first fiber cable. The first optical signal traffic may include optical signals generated at the first location having wavelengths within a first one of multiple predefined optical wavelength bands supported in the optical network. For example, the first optical signal traffic may include optical signals having wavelengths within the C-Band (e.g., between 1530 and 1565 nanometers).

At 904, the method may include beginning to exchange second optical signal traffic between the first location and the second location in the optical network over a second fiber cable. The second optical signal traffic may include optical signals generated at the first location having wavelengths within the first predefined optical wavelength band (e.g., within the C-Band).

At 906, the method may include converting, at the first location, the first optical signal traffic to third optical signal traffic comprising optical signals having wavelengths within a second one of the multiple predefined optical wavelength bands. For example, the first optical signal traffic may be converted a third optical signal traffic that includes optical signals having wavelengths within the L-Band (e.g., between 1565 and 1625 nanometers).

If at 908, an interruption in the exchange of the first optical signal traffic is detected (e.g., if the first fiber cable is cut or otherwise fails and this condition is detected by an optical switch), method 900 may proceed to 810. Otherwise, the method may return to 902 after which the first and second optical signal traffic continue to be exchanged, and the first optical signal traffic continues to be converted to third optical signal traffic in the second one of the multiple predefined optical wavelength bands until and unless an interruption of the first optical signal traffic is detected.

At 910, method 900 may include causing the third optical signal traffic to be carried from the first location to the second location over the second fiber cable while the second optical signal traffic is exchanged over the second fiber cable. For example, an optical switch at the first location may route the third optical signal traffic to a band combiner that merges the third optical signal traffic and the second optical signal traffic for transmission over the second fiber cable. In some embodiments, if, or once, the first fiber cable is subsequently repaired or otherwise returned to service and this condition is detected (e.g., by an optical switch at the first or second location), the method may return to 902, after which the first and second optical signal traffic may be exchanged over the first and second fiber cables, respectively, without first being converted to the second one of the multiple predefined optical wavelength bands.

Note that FIG. 9 illustrates an example embodiment in which the first optical signal traffic is preemptively converted to third optical signal traffic in the second one of the multiple predefined optical wavelength bands even before there is any occurrence or detection of an interruption in the exchange of the first optical signal traffic between the first and second locations. However, in other embodiments, the conversion of the first optical signal traffic to the third optical signal traffic might not be performed until and unless an interruption in the exchange of the first optical signal traffic between the first and second locations is detected.

While FIG. 9 illustrates an example embodiment in which the first predefined optical wavelength band is the C-Band and the second predefined optical wavelength band is the L-Band, in other embodiments, one or more of the first and second predefined optical wavelength bands may be different than in this example embodiment. For example, in some embodiments, the first optical signal traffic and the second optical signal traffic may include optical signals having wavelengths within the C-Band, and the third optical signal traffic may include optical signals having wavelengths within the S-Band. In another example, the first optical signal traffic and the second optical signal traffic may include optical signals having wavelengths within the L-Band, and the third optical signal traffic may include optical signals having wavelengths within the C-Band. In general, the multiple predefined optical wavelength bands may include two or more of: the C-Band, comprising wavelengths between 1530 and 1565 nanometers, the L-Band, comprising wavelengths between 1565 and 1625 nanometers, and the S-Band, comprising wavelengths between 1460 and 1530 nanometers, in various embodiments.

In some embodiments, depending on the distances between the source and destination locations on various paths between these locations, the optical network may include intermediate locations between the source and destination locations at which the path protection techniques may be implemented. In some embodiments, equipment for re-amplifying optical signal traffic in the C-Band or the L-Band may be located at particular ones of the intermediate locations. For example, conversions by existing wavelength converters from the C-Band to the L-Band, or vice versa, may compromise or cause optical "damage" to the converted optical signal traffic affecting its transmission performance. For example, a maximum transmission range for optical signal traffic converted using an existing wavelength converter may be on the order of 140 kilometers or 87 miles.

As described herein, the optical networks described herein may include wavelength converters to convert optical signal traffic from one predefined optical wavelength band to another, along with associated band combiners and optical switches, to provide path protection. The techniques described herein may be used to provide path protection for the entire payload, e.g., all 96 wavelengths in the C-Band, rather than only for individual wavelengths. In at least some embodiments, the advantages of the disclosed approach may include the following: path protection is provided without having to dedicate an entire fiber or fiber cable for protection (i.e., all fibers can be used to carry optical signal traffic), full protection capability is supported (e.g., for all wavelengths within a predefined optical wavelength band), there is minimal equipment required for path protection, and the approach is efficient in that path protection is applied at the "Band" level and not at the individual transponder level.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for protecting optical paths using wavelength conversion, comprising:
   a first fiber cable between a first location and a second location;
   a second fiber cable between the first location and the second location;
   a first collection of transponders at the first location configured to exchange first optical signal traffic with a second collection of transponders at the second location over the first fiber cable, the first collection of transponders being configured to generate the first optical signal traffic as optical signals having wavelengths within a first one of multiple predefined optical wavelength bands;
   a third collection of transponders at the first location configured to exchange second optical signal traffic with a fourth collection of transponders at the second location over the second fiber cable, the third collection of transponders being configured to generate the second optical signal traffic as optical signals having wavelengths within the first one of the multiple predefined optical wavelength bands;
   a first optical wavelength converter at the first location configured to convert the first optical signal traffic to third optical signal traffic comprising optical signals having wavelengths within a second one of the multiple predefined optical wavelength bands; and
a first optical switch at the first location configured to:
  detect an interruption in the exchange of the first optical signal traffic over the first fiber cable; and
  responsive to the detection of the interruption in the exchange of the first optical signal traffic, cause the third optical signal traffic to be carried to the second location over the second fiber cable while the second optical signal traffic is exchanged with the fourth collection of transponders at the second location over the second fiber cable.

2. The system of claim 1, wherein the first wavelength converter comprises a nonlinear medium that converts all wavelengths within the first one of the multiple predefined optical wavelength bands to respective wavelengths within the second one of the multiple predefined optical wavelength bands.

3. The system of claim 1, further comprising:
a band combiner at the first location configured to combine the third optical signal traffic and the second optical signal traffic for transmission to the second location over the second fiber cable;
a band splitter at the second location configured to split transmissions received over the second fiber cable into the third optical signal traffic and the second optical signal traffic;
a second optical wavelength converter at the second location configured to convert the third optical signal traffic to fourth optical signal traffic comprising optical signals having wavelengths within the first one of the multiple predefined optical wavelength bands; and
a second optical switch at the second location configured to:
  detect the interruption in the exchange of the first optical signal traffic over the first fiber cable; and
  responsive to the detection of the interruption in the exchange of the first optical signal traffic, cause the fourth optical signal traffic to be provided to the second collection of transponders.

4. The system of claim 1, wherein the multiple predefined optical wavelength bands comprise two or more of:
the C-Band, comprising wavelengths between 1530 and 1565 nanometers;
the L-Band, comprising wavelengths between 1565 and 1625 nanometers; and
the S-Band, comprising wavelengths between 1460 and 1530 nanometers.

5. The system of claim 4, wherein:
the first optical signal traffic and the second optical signal traffic comprise optical signals having wavelengths within the C-Band; and
the third optical signal traffic comprises optical signals having wavelengths within the L-Band or within the S-Band.

6. The system of claim 4, wherein:
the first optical signal traffic and the second optical signal traffic comprise optical signals having wavelengths within the L-Band; and
the third optical signal traffic comprises optical signals having wavelengths within the C-Band.

7. The system of claim 1, wherein:
each transponder in the first collection of transponders is configured to generate and receive optical signals having a respective one of the wavelengths within the first one of the multiple predefined optical wavelength bands;
each transponder in the second collection of transponders is configured to generate and receive optical signals having a respective one of the wavelengths within the first one of the multiple predefined optical wavelength bands;
each transponder in the third collection of transponders is configured to generate and receive optical signals having a respective one of the wavelengths within the first one of the multiple predefined optical wavelength bands; and
each transponder in the fourth collection of transponders is configured to generate and receive optical signals having a respective one of the wavelengths within the first one of the multiple predefined optical wavelength bands.

8. The system of claim 1, further comprising:
a second optical wavelength converter at the first location configured to convert the second optical signal traffic to fourth optical signal traffic comprising optical signals having wavelengths within the second one of the multiple predefined optical wavelength bands; and
a second optical switch at the first location configured to:
  detect an interruption in the exchange of the second optical signal traffic over the second fiber cable; and
  responsive to the detection of the interruption in the exchange of the second optical signal traffic, cause the fourth optical signal traffic to be carried to the second location over the first fiber cable while the first optical signal traffic is exchanged with the second collection of transponders at the second location over the first fiber cable.

9. The system of claim 8, further comprising:
a band combiner at the first location configured to combine the fourth optical signal traffic and the first optical signal traffic for transmission to the second location over the first fiber cable;
a band splitter at the second location configured to split transmissions received over the first fiber cable into the fourth optical signal traffic and the first optical signal traffic;
a third optical wavelength converter at the second location configured to convert the fourth optical signal traffic to fifth optical signal traffic comprising optical signals having wavelengths within the first one of the multiple predefined optical wavelength bands; and
a third optical switch at the second location configured to:
  detect the interruption in the exchange of the second optical signal traffic over the second fiber cable; and
  responsive to the detection of the interruption in the exchange of the second optical signal traffic, cause the fifth optical signal traffic to be provided to the second collection of transponders.

10. The system of claim 1, wherein:
the second collection of transponders is configured to exchange fourth optical signal traffic with the first collection of transponders at the first location over the first fiber cable, the second collection of transponders being configured to generate the fourth optical signal traffic as optical signals having wavelengths within the first one of multiple predefined optical wavelength bands;
the fourth collection of transponders is configured to exchange fifth optical signal traffic with the third collection of transponders at the first location over the second fiber cable, the fourth collection of transponders being configured to generate the fifth optical signal traffic as optical signals having wavelengths within the first one of the multiple predefined optical wavelength bands; and the system further comprises:
a second optical wavelength converter at the second location configured to convert the fourth optical signal traffic to sixth optical signal traffic comprising optical signals having wavelengths within the second one of the multiple predefined optical wavelength bands; and a second optical switch at the second location configured to:
detect an interruption in the exchange of the fourth optical signal traffic over the first fiber cable; and
responsive to the detection of the interruption in the exchange of the fourth optical signal traffic, cause the sixth optical signal traffic to be carried to the first location over the second fiber cable while the fifth optical signal traffic is exchanged with the third collection of transponders at the first location over the second fiber cable.

11. The system of claim 1, wherein the first fiber cable traverses a different path between the first location and the second location than the path between the first location and the second location traversed by the second fiber cable.

12. A method for protecting optical paths using wavelength conversion, comprising:
beginning to exchange first optical signal traffic between a first location and a second location over a first fiber cable, the first optical signal traffic comprising optical signals generated at the first location having wavelengths within a first one of multiple predefined optical wavelength bands;
beginning to exchange second optical signal traffic between the first location and the second location over a second fiber cable, the second optical signal traffic comprising optical signals generated at the first location having wavelengths within the first one of the multiple predefined optical wavelength bands;
converting, at the first location, the first optical signal traffic to third optical signal traffic comprising optical signals having wavelengths within a second one of the multiple predefined optical wavelength bands;
detecting, at the first location, an interruption in the exchange of the first optical signal traffic over the first fiber cable; and
in response to detecting the interruption in the exchange of the first optical signal traffic, causing the third optical signal traffic to be carried from the first location to the second location over the second fiber cable while the second optical signal traffic is exchanged over the second fiber cable.

13. The method of claim 12, wherein converting the first optical signal traffic to the third optical signal traffic comprises converting all wavelengths within the first one of the multiple predefined optical wavelength bands to corresponding wavelengths within the second one of the multiple predefined optical wavelength bands.

14. The method of claim 12, wherein converting the first optical signal traffic to the third optical signal traffic is performed in response to detecting the interruption in the exchange of the first optical signal traffic over the first fiber cable.

15. The method of claim 12, further comprising:
combining, at the first location, the third optical signal traffic and the second optical signal traffic for transmission to the second location over the second fiber cable;
splitting, at the second location, transmissions received over the second fiber cable into the third optical signal traffic and the second optical signal traffic; and
converting, at the second location, the third optical signal traffic to fourth optical signal traffic comprising optical signals having wavelengths within the first one of the multiple predefined optical wavelength bands.

16. The method of claim 12, wherein the multiple predefined optical wavelength bands comprise two or more of:
the C-Band, comprising wavelengths between 1530 and 1565 nanometers;
the L-Band, comprising wavelengths between 1565 and 1625 nanometers; and
the S-Band, comprising wavelengths between 1460 and 1530 nanometers.

17. The method of claim 16, wherein:
the first optical signal traffic and the second optical signal traffic comprise optical signals having wavelengths within the C-Band; and
the third optical signal traffic comprises optical signals having wavelengths within the L-Band.

18. The method of claim 12, further comprising:
prior to detecting the interruption in the exchange of the first optical signal traffic over the first fiber cable:
beginning to exchange fourth optical signal traffic between the second location and the first location over the first fiber cable, the fourth optical signal traffic comprising optical signals generated at the second location having wavelengths within the first one of the multiple predefined optical wavelength bands; and
beginning to exchange fifth optical signal traffic between the second location and the first location over the second fiber cable, the fifth optical signal traffic comprising optical signals generated at the second location having wavelengths within the first one of the multiple predefined optical wavelength bands;
converting, at the second location, the fourth optical signal traffic to sixth optical signal traffic comprising optical signals having wavelengths within the second one of the multiple predefined optical wavelength bands;
detecting, at the second location, an interruption in the exchange of the fourth optical signal traffic over the first fiber cable; and
in response to detecting the interruption in the exchange of the fourth optical signal traffic, causing the sixth optical signal traffic to be carried from the second location to the first location over the second fiber cable while the fifth optical signal traffic is exchanged over the second fiber cable.

19. The method of claim 18, wherein converting the fourth optical signal traffic to the sixth optical signal traffic is performed in response to detecting the interruption in the exchange of the fourth optical signal traffic.

20. The method of claim 12, wherein the first fiber cable and the second fiber cable are of different lengths.

* * * * *